United States Patent [19]

Jerdee

[11] Patent Number: 5,450,988
[45] Date of Patent: Sep. 19, 1995

[54] POWERED CAULKING GUN

[75] Inventor: Jeffrey S. Jerdee, Brooklyn Center, Minn.

[73] Assignee: Wagner Spray Tech Corporation, Minneapolis, Minn.

[21] Appl. No.: 275,379

[22] Filed: Jul. 18, 1994

[51] Int. Cl.⁶ .............................................. G01F 11/00
[52] U.S. Cl. .................................. 222/333; 222/390; 74/474.8 R
[58] Field of Search ............... 222/326, 327, 333, 390; 74/424.8 R, 424.8 NA

[56] References Cited

U.S. PATENT DOCUMENTS

| | | | |
|---|---|---|---|
| 1,139,865 | 5/1915 | Hickish | 222/390 |
| 1,374,263 | 4/1921 | Watson | 222/390 |
| 1,637,908 | 8/1927 | Lea | 222/390 X |
| 4,150,769 | 4/1979 | James | 222/333 X |
| 4,198,872 | 4/1980 | Metz | 74/424.8 R X |
| 4,260,076 | 4/1981 | Bergman | 222/333 X |
| 4,335,834 | 1/1982 | Zepkin | 222/63 |
| 4,583,934 | 4/1986 | Hata | 222/327 X |
| 4,615,469 | 10/1986 | Kishi | 222/327 |
| 4,669,636 | 6/1987 | Miyata | 222/327 X |
| 4,741,221 | 5/1988 | Hudimac | 74/424.8 NA |
| 4,784,114 | 11/1988 | Muckler | 126/299 E |
| 4,823,992 | 4/1989 | Fiorentini | 222/333 |
| 4,986,454 | 1/1991 | Riley | 222/327 |
| 5,022,277 | 6/1991 | Shaffer | 74/424.8 NA |
| 5,104,005 | 4/1992 | Schneider, Jr. et al. | 222/390 X |
| 5,219,099 | 6/1993 | Spence | 222/325 |

FOREIGN PATENT DOCUMENTS 74202325  8/1985  Taiwan .
74301276  11/1985  Taiwan .

OTHER PUBLICATIONS

Article 909 ASSE Powered Caulking Gun Operating Instructions (Best available copy) 2 pages.
AEG Rechargeable variable speed Cordless Caulking Gun EZ581 Operating Instructions 7 sheets, (10 original pages+cover+parts list+exploded view).

Primary Examiner—Kevin P. Shaver
Attorney, Agent, or Firm—Faegre & Benson

[57] ABSTRACT

A cordless electric powered caulking gun for pressurizing a tube of highly viscous substance includes a ball drive rod having a helical thread and a keyway, an electric motor and gear reducer coupled to a spur gear keyed to the ball drive rod, a cylindrical ball retainer having a plurality of pockets located on a helical locus aligned with the helical thread, a plurality of balls with one ball in each pocket of the retainer, a ball drive nut telescoped over and selectively axially moveable between a first and second position with respect to the ball retainer, and a trigger coupled to the ball drive nut via a spring to urge the nut from the first position to the second position when the trigger is actuated. The trigger further has a bearing surface and axial contact with the ball drive nut to force the nut to the first position when the trigger is released to a deactuated position. The ball drive nut holds the balls in engagement with the rod when the nut is in the second position and lightly holds the balls in engagement with the rod when the nut is in the first position, but permits the disengagement of the balls with the rod when the rod is moved manually.

23 Claims, 8 Drawing Sheets

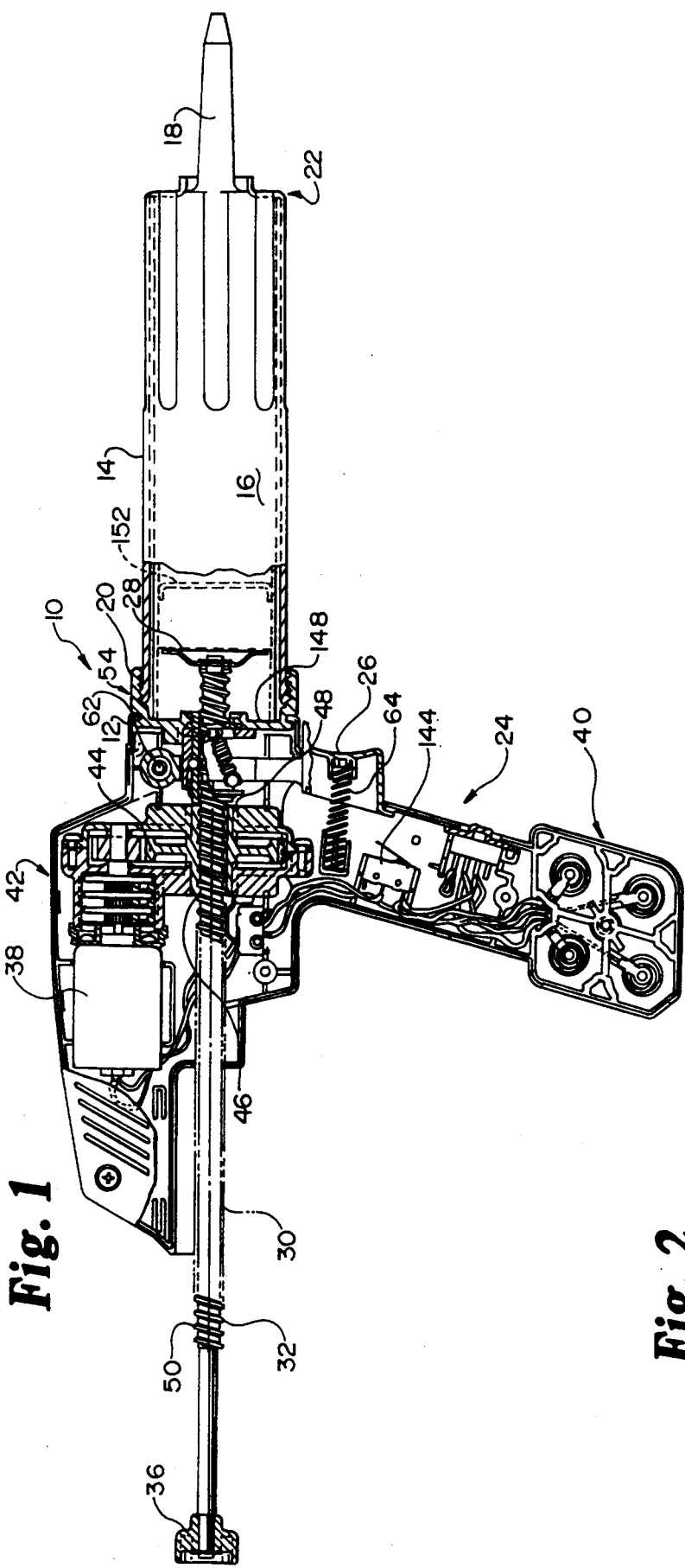
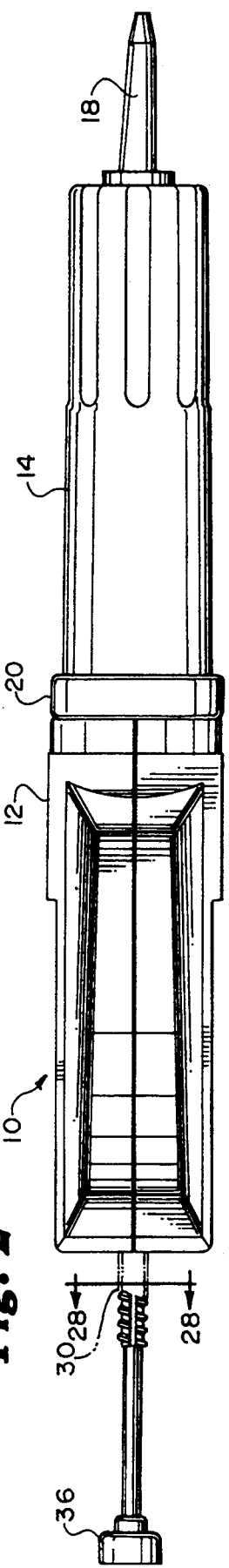
Fig. 1
Fig. 2

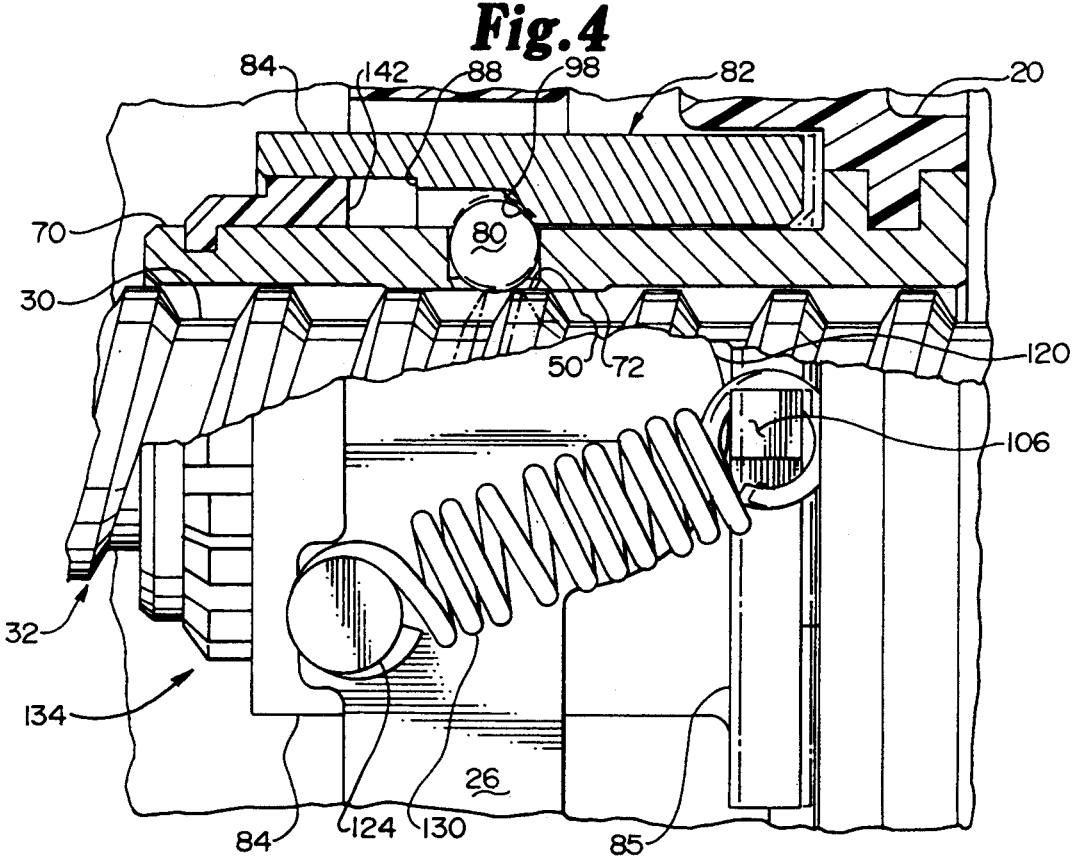
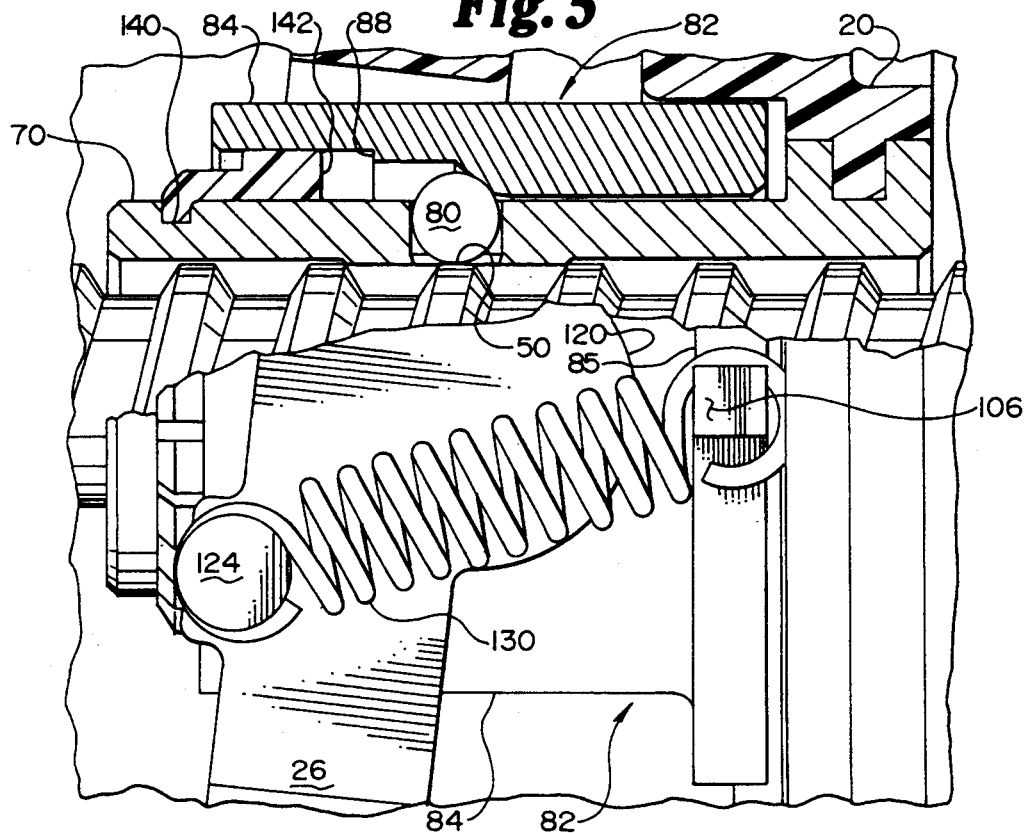

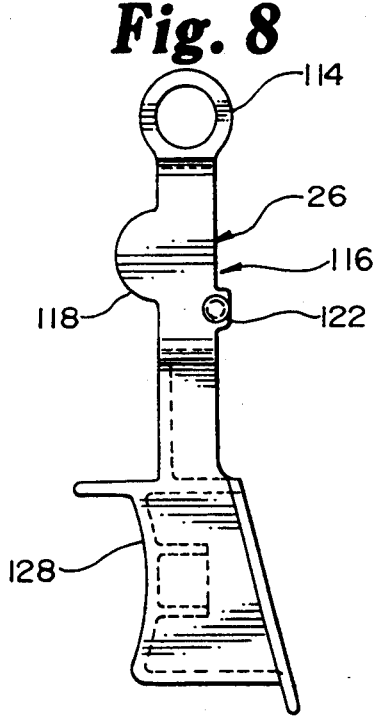
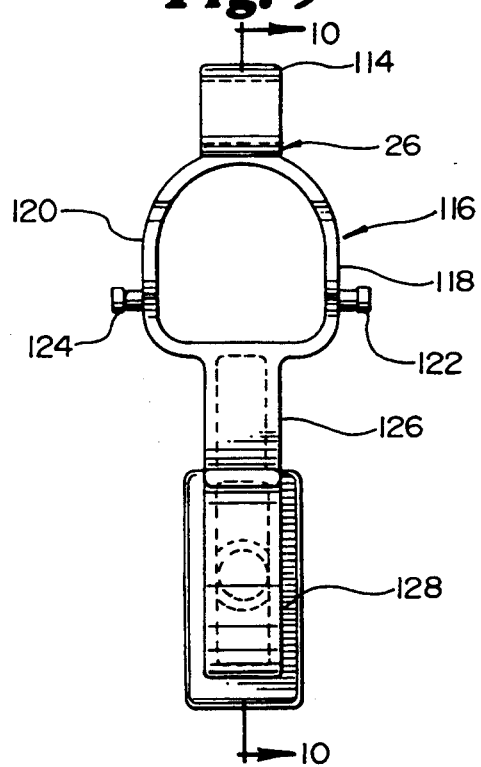
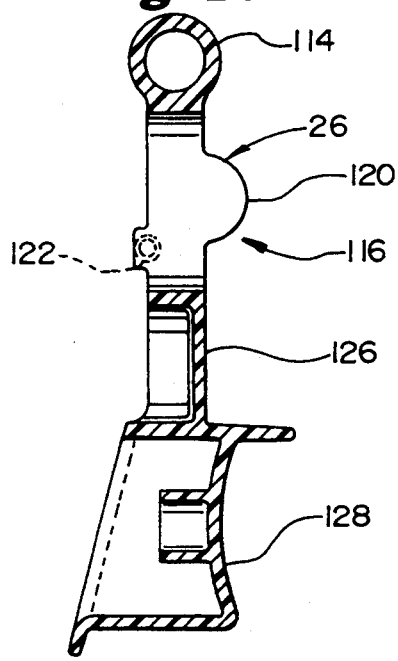
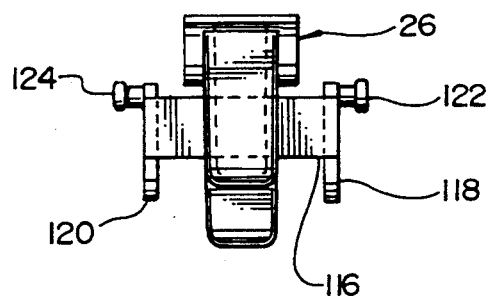

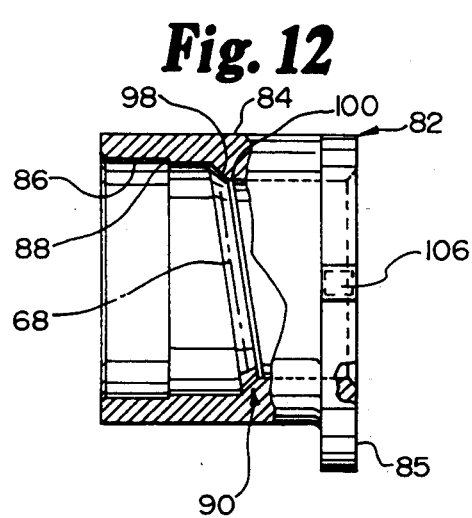
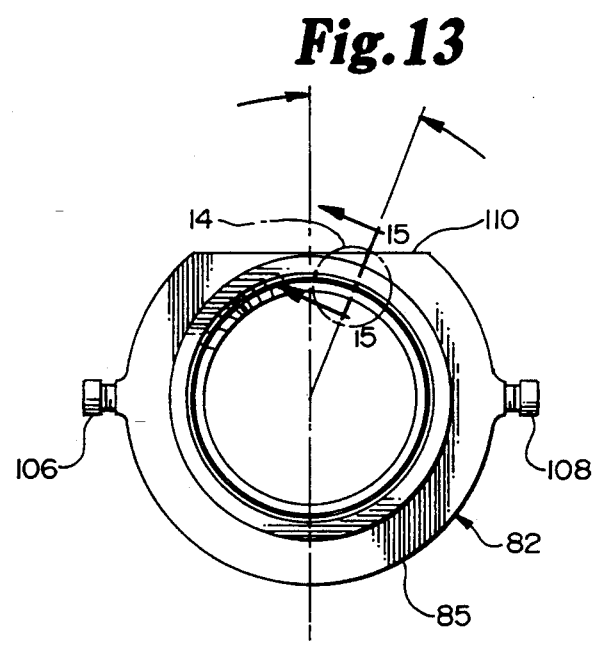
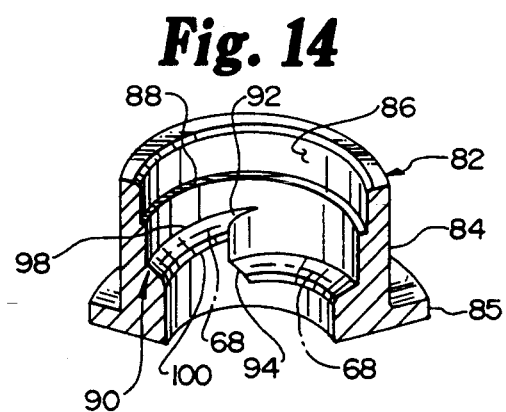
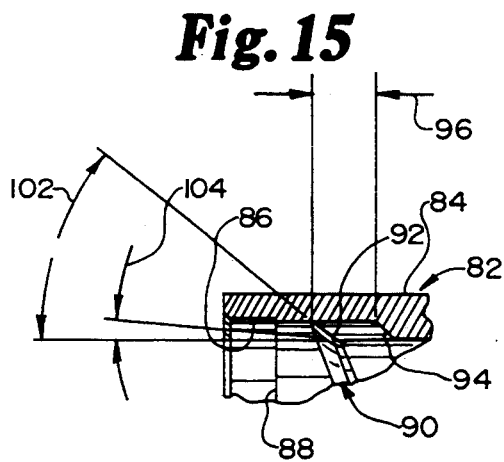

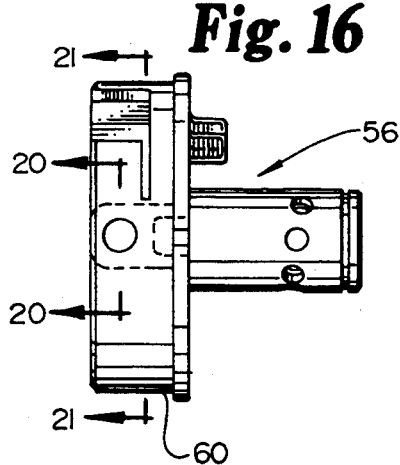
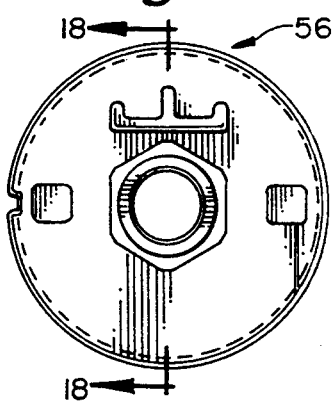
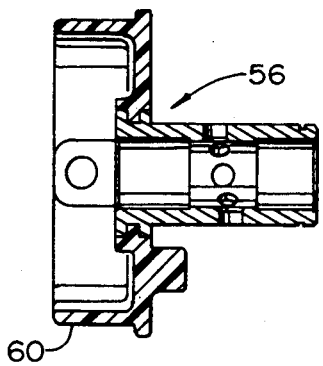
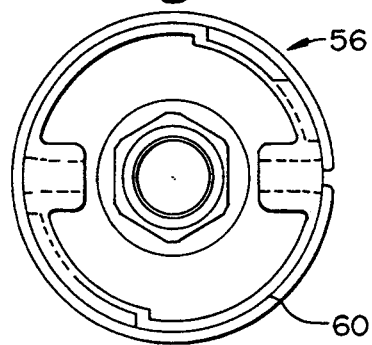
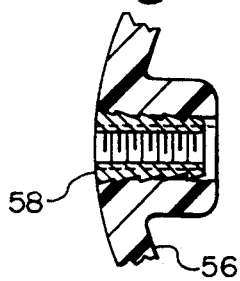
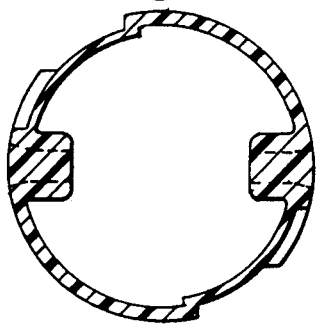
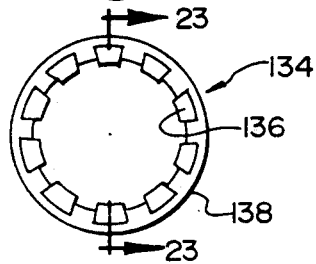
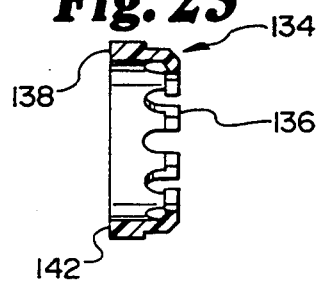

POWERED CAULKING GUN

BACKGROUND OF THE INVENTION

This invention relates to the field of caulking guns, more particularly to cordless powered caulking guns.

BRIEF DESCRIPTION OF THE DRAWINGS

FIG. 1 is a side view partially in section of a caulking gun of the present invention.

FIG. 2 is a top view of the caulking gun of FIG. 1.

FIG. 4 is a still further enlarged partial section view of a portion of the operating mechanism of the caulking gun of the present invention with the parts shown in a first position, corresponding to the gun OFF condition.

FIG. 5 is a view similar to FIG. 4, but with the trigger of the caulking gun moved to an on position calling for pressure to be applied to the tube of viscous substance, but with the ball drive rod in an interference position with the balls and collar assembly.

FIG. 8 is a side view of a trigger useful in the practice of the present invention.

FIG. 9 is an end view of the trigger of FIG. 8.

FIG. 10 is a section view taken along line 10—10 of FIG. 9.

FIG. 11 is a top view of the trigger of FIG. 8.

FIG. 12 is a partial section view of a sleeve for the collar assembly useful in the practice of the present invention.

FIG. 13 is an end view of the sleeve of FIG. 12.

FIG. 14 is a fragmentary detail view of region 14 as indicated in FIG. 13.

FIG. 15 is a fragmentary section view taken along line 15—15 of FIG. 13 illustrating certain aspects of a sleeve useful in the practice of the present invention.

FIG. 16 is a side view of a ball retainer assembly useful in the practice of the present invention.

FIG. 17 is an end view of the ball retainer of FIG. 16.

FIG. 18 is a section view taken along line 18—18 of FIG. 17.

FIG. 19 is an end view of the ball retainer taken from the end opposite that shown in FIG. 17.

FIG. 20 is a fragmentary section view taken along line 20—20 of FIG. 16.

FIG. 21 is a section view taken along line 21—21 of FIG. 16.

FIG. 22 is an end view of a castle clip useful in the practice in the present invention.

FIG. 23 is a section view taken along line 23—23 of FIG. 22.

DETAILED DESCRIPTION OF THE INVENTION

Figure 3:
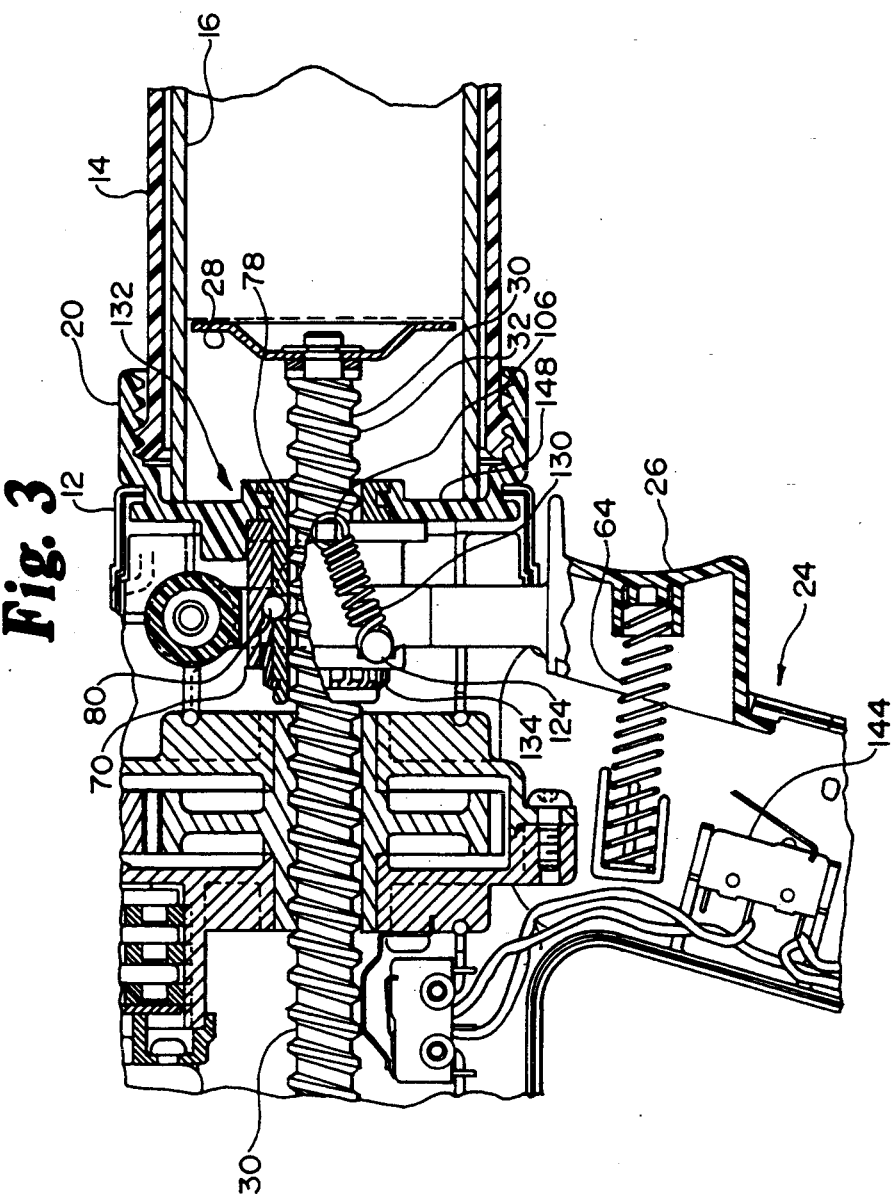
FIG. 3 is an enlarged fragmentary section view of FIG. 1.

Referring to the Figures, and most particularly to FIG. 1, a caulking gun 10 useful in the practice of the present invention may be seen. Gun 10 includes a housing 12 and a barrel 14 for retaining a tube or cartridge 16 of caulk or other viscous substance such as sealant or adhesive. Tube 16 preferably has a tip or spout 18 projecting from barrel 14. In the embodiment shown in FIG. 1 barrel 14 is secured to housing 12 by a internally threaded member 20. In an alternative embodiment (not shown) barrel 14 may be permanently secured to housing 12 or member 20, and a cap or other removable barrier may be located at the distal end 22 of barrel 14 to provide for replacement of tube 16 in barrel 14. A knob 36 may be provided on the end of rod 30 to permit convenient and comfortable means for grasping and moving rod 30 manually.

Figure 28:
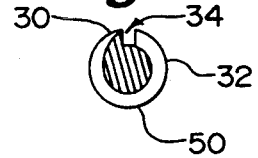
FIG. 28 is a section view of a ball drive rod taken along line 28—28 of FIG. 2.

Gun 10 further has a handle 24 and a trigger 26 which is moveable with respect to the handle 24 to place gun 10 in one of three operating conditions: ON, OFF, or FEATHERING. Gun 10 also has a pressure plate 28 which is selectively driven by a ball drive rod 30 in the ON condition and which is held in position in the FEATHERING condition or mode of gun 10. Rod 30 has a helical thread 32 rod 30 also has a keyway 34 as may be seen most clearly in FIG. 28.

Figure 24:
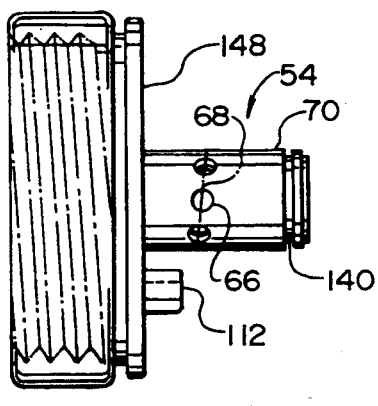
FIG. 24 is a side view of an alternative embodiment of a ball retainer useful in the practice of the present invention.
Figure 25:
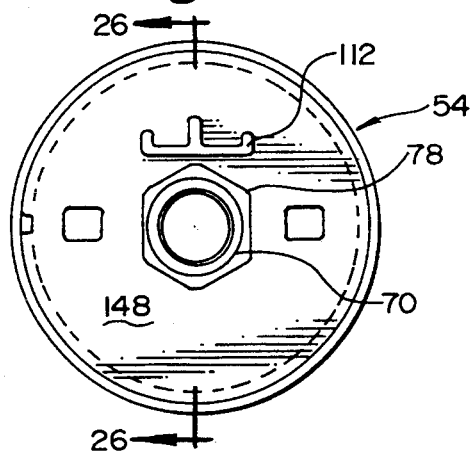
FIG. 25 is an end view of the ball retainer of FIG. 24.

Gun 10 also preferably has an electric motor 38 which may be a model RS-540RH-4070 available from Mabuchi Motor. Motor 38 is preferably powered by a plurality of batteries (not shown per se but which are located in housing 40). When energized in the ON condition, motor 38 drives a gear train 42 whose output is available at spur gear 44 (also see FIG. 27) to drive rod 30 via a key 46 which is received in keyway 34 of rod 30. As may be seen most clearly in FIG. 1, gear 44 has an extended hub 48 carrying key 46. Hub 48 provides a first bearing surface for rod 30, since the crown 50 of helix 32 rides in and is guided by a bore 52 of hub 48. A second bearing for rod 30 is provided by a ball retainer 54 which may be seen most clearly in FIGS. 24–26. It is to be understood that one end of ball retainer 54 is internally threaded to serve as the member 20 for retaining barrel 14 in the embodiments shown in FIGS. 1 and 24–26. An alternative ball retainer embodiment 56 may be seen in FIGS. 16–21. When ball retainer 56 is used, a pair of screws (not shown) are received in threaded inserts 58 and hold retainer 56 and an alternative embodiment for barrel 14 (which is telescopically received over the cylindrical projection 60 of ball retainer 56) to housing 12. When the alternative embodiment for barrel 14 is used, it is to be understood that provision at the distal or spout end 22 of barrel 14 will be provided for replacing spent tubes or cartridges 16.

Trigger 26 is mounted for pivoting movement with respect to housing 12 at pivot 62 (see FIG. 1) and provides both mechanical and electrical actuation of the operating mechanism of gun 10 as will be described below. A return spring 64 will return trigger 26 (and gun 10) to the OFF condition shown in FIG. 1 when operator finger pressure is removed from trigger 26.

Figure 26:
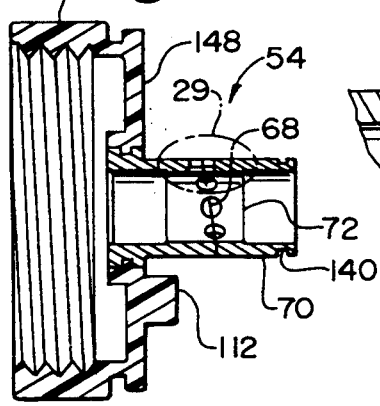
FIG. 26 is a section view of the ball retainer taken along line 26—26 of FIG. 25.
Figure 29:
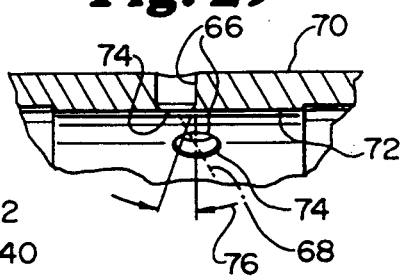
FIG. 29 is a fragmentary detail view of the region 29 of FIG. 26.
Figure 27:
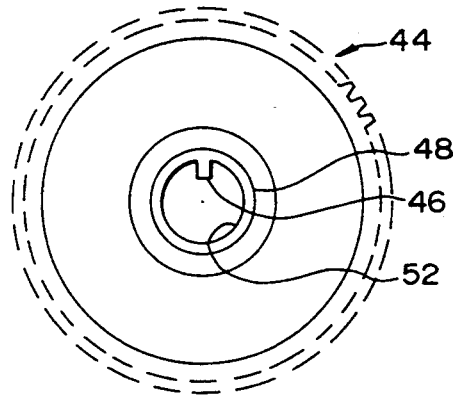
FIG. 27 is an end view of a spur gear useful in the practice of the present invention.

Referring now to FIGS. 24–29, the cylindrical ball retainer 54 of caulking gun 10 has a plurality of pockets 66 located on a helical locus or path 68 aligned with the helical thread 32 of rod 30. Referring now most particularly to FIGS. 26 and 29, ball retainer 54 has a metal cylinder 70 preferably formed of 304 stainless steel molded to the member 20 which is itself preferably formed of a plastic such as Nylon, for example Dupont Zytelst 801. Cylinder 70 has a step or land 72 surrounding pockets 66 to serve as the second or additional bushing or support for rod 30 mentioned previously. Cylinder 70 is relieved distal of land 72 to allow rod 30 to "float" to allow for misalignment of the ball pockets 66 arising from manufacturing tolerances.

Referring now most particularly to FIG. 29, each of ball pockets 66 are formed as a bore having parallel sides ending in a cone shaped reduced diameter portion 74. In the embodiment shown, the cone angle 76 is preferably 30 degrees.

In the embodiment shown, the diametral wall thickness of cylinder 70 is preferably 0.005 inches thicker in land 72 as compared to the wall thickness of cylinder 70 distal of land 72. As may be seen in FIG. 25, a hex shaped boss 78 is preferably formed at the end of cylinder 70 to resist separation between plastic member 20 and steel cylinder 70 when torque is applied between the plastic and metal portions 20, 70 of the ball retainer 54 as occurs in operation of gun 10. In the embodiment shown it is preferable to have eight pockets 66 in ball retainer 54. Balls 80 are preferably formed of AISI type 440-C stainless steel per ASTM 756 with a rockwell hardness of C58-65.

Figure 7:
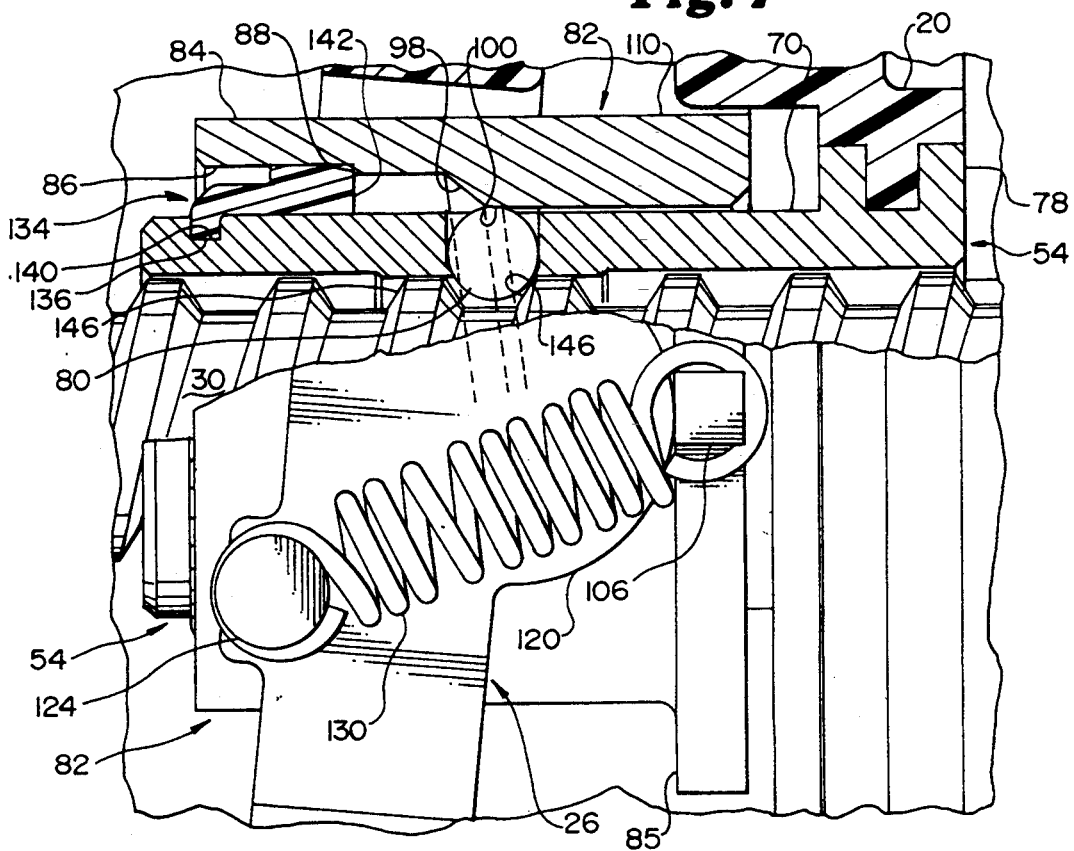
FIG. 7 is an enlarged view similar to FIGS. 4 and 5 except with the balls engaged with the drive rod and with the gun in the ON condition.

Referring now also to FIGS. 12–15, a ball drive nut 82 is preferably telescoped over and selectively axially movable between first and second positions with respect to the ball retainer 54. The first position of nut or sleeve 82 is shown in FIG. 3 and corresponds to the OFF condition. The second position of sleeve 82 is shown in FIG. 7 and corresponds to both the ON and FEATHERING conditions of gun 10.

Nut 82 has a cylindrical portion 84 and a integrally formed flange 85 connected thereto. Cylinder portion 84 has an internal step 86 ending in a radial shoulder 88. Nut 82 also has an interior ramp-like surface 90 located along helical locus or path 68. It is to be understood (referring now most particularly to FIGS. 14 and 15) that surface 90 begins at a starting location 92, and extends around one revolution or circumference within nut 82, stopping at ending location 94. The starting and ending locations 92, 94 are offset axially by a distance 96 determined by the pitch of helical locus 68 (which is identical to the pitch of helical thread 32 of rod 30). Surface 90 has a first ramp portion 98 having a relatively steep slope 102 and a second ramp portion 100 having a relatively shallow slope 104. Referring most particularly to FIG. 15, the slope 102 of first ramp portion 98 is preferably 40° and the slope 104 of the second ramp portion is preferably 7½°. Ball drive nut or sleeve 82 also has a pair of ears 106, 108 formed integrally with radial flange 85. Flange 85 also has a flat portion 110 positioned and sized to nest between a projection 112 and cylinder 70 of ball retainer 54, as may be seen most clearly in FIG. 3. The nesting relationship of flat portion 110 on nut 82 with projection 112 of member 20 prevents rotation of nut 82 with respect to retainer 54, while permitting axial freedom of movement therebetween for purposes which will be explained below.

Referring now to FIGS. 8–11, trigger 26 has a ring 114 at one end thereof connected to a yoke portion 116 which carries a pair of bosses 118, 120 and a pair of ears 122, 124. Yoke portion 116 is further connected to an extension 126 which is integrally formed with and carries a concave, generally rectangular-shaped grasping portion 128 adapted to be manually depressed by the finger of an operator of the caulking gun 10.

Referring now again to FIG. 3, an extension spring 130 is mounted between ear 106 of nut 82 and ear 124 of trigger 26. Spring 130 will urge flange 85 of nut or collar 82 to move toward bosses 118, 120 on yoke 16 of trigger 26. It is to be understood that a second spring (not shown) identical to spring 130 is connected between ears 108 and 122. As shown most clearly in FIG. 3, a collar assembly 132 is made up of ball retainer 54, a plurality of balls 80, ball drive nut 82, and a clip 134 preferably formed of a plastic such Delrin 100. Clip 134 preferably has a plurality of radially inwardly directed teeth 136 carried by an annular ring 138. Ring 138 has an outside diameter sized to support internal step 86 for axially sliding movement when clip 134 is installed on cylinder 70 with teeth 136 received in a snap ring groove 140. Axial face 142 of clip 134 also provides a stop surface for abutment with radial shoulder 88 when nut 82 moves axially over ball retainer 54 to the second position shown in FIG. 7 which corresponds to the ON and FEATHERING conditions.

Referring now to FIGS. 4–7, and most particularly to FIG. 4, the operation of caulking gun 10 is as follows. FIG. 4 shows the gun in the OFF condition. In this condition, trigger 26 is urged to the position shown by spring 64 (see FIGS. 1 and 3) and spring 130 urges flange 85 against boss 120 causing first ramp portion 98 to move balls 80 to the position shown in solid lines in FIG. 4, where it is to be understood that the balls 80 project slightly radially inward of land 72 to lightly engage the crown 50 of helical thread 32 of rod 30. As may be seen in FIG. 4, land 72 supports crown 50 of helical thread 32. When balls 80 are in this position, they will prevent rod 30 from sliding of its own weight (when gun 10 is tipped), but they will at the same time permit manual movement of rod 30 (as for example, when manually urged by knob 36) to permit manual adjustment of the rod, for example to move pressure plate 28 against the piston or rear surface 152 in the caulking cartridge 16 in the gun 10 (see FIG. 1). When rod 30 is manually moved in this fashion, balls 80 will momentarily move radially outward to the position shown in phantom in FIG. 4, momentarily driving nut 82 to the position shown in phantom by action of ball 80 against first ramp 98. Spring 130 will "give" or extend, permitting movement of flange 85 away from boss 120 as this occurs. Once the crown 50 passes balls 80, the balls 80 and nut 82 will return to the position shown in solid lines in FIG. 4.

Turning now to FIG. 5, when gun 10 is first activated from the OFF to the ON condition, it is possible that the crown 50 of rod 30 will be interfering with balls 80 (as shown in FIG. 5), and when trigger 26 is depressed to the intermediate FEATHERING or ON condition, the parts will initially be in the relationship shown in FIG. 5. Once trigger 26 is moved sufficiently far to close switch 144 (see FIGS. 3 and 6) motor 38 will be energized and rod or lead screw 30 will rotate causing the crown 50 of helical thread 32 to move out of interference with balls 80. Once the crown 50 of thread 32 moves out of interference, balls 80 will move radially inward, as driven by the axial movement of sleeve 82, as it moves from the first position (of FIGS. 3 and 4) to the second position as shown in FIG. 7. The balls will come to rest in pockets 66, because of the close tolerance of balls 80 within the pockets 66. The cone-shaped reduced diameter portion 74 of pocket 66 will hold each ball 80 in the position shown in FIGS. 6 and 7 when the gun is in the ON condition. At this time nut or sleeve 82 is in the second position which is representative of an engaged relationship between balls 80 and rod 30. In this condition, balls 80 will be resting on the second ramp portion 100 of nut 82, as may be seen in FIG. 7. As will be recalled, portion 100 has a relatively shallow slope, preferably seven and one-half degrees. This shallow slope ramp portion provides two functions. First, when trigger 26 is released to the OFF condition shown in FIG. 4, the shallow-slope 100 in contact with balls 80 will assist movement of nut 82 to the first or OFF position shown in FIGS. 3 and 4. Second the shallow slope of ramp portion 100 will provide an overload release when the axial component of the force between balls 80 and surface 100 is sufficient to overcome the axial component of the spring tension force from spring 130. At this time balls 80 will drive sleeve 82 against the action of spring 130 and permit the balls 80 to move radially outward, being driven in that direction by the sloped trailing side 146 of helical thread 32 (see FIG. 7). It is thus to be understood that the axial component of force from side 146 will transfer radially through balls 80 to an axial parting force at surface 100, causing axial movement of nut 82 to ultimately permit movement of balls 80 radially outward, releasing engagement with helical thread 32.

A second overload release is provided by the radially extending flange portion 148 of member 20. It is to be understood that member 20, being formed of a relatively stiff, but resilient material, can elastically deform in an "oil can" fashion permitting axial movement of the cylindrical portion 70 of ball retainer 54 in a direction to enable radial release of balls 80 in the event of an overload condition.

Figure 6:
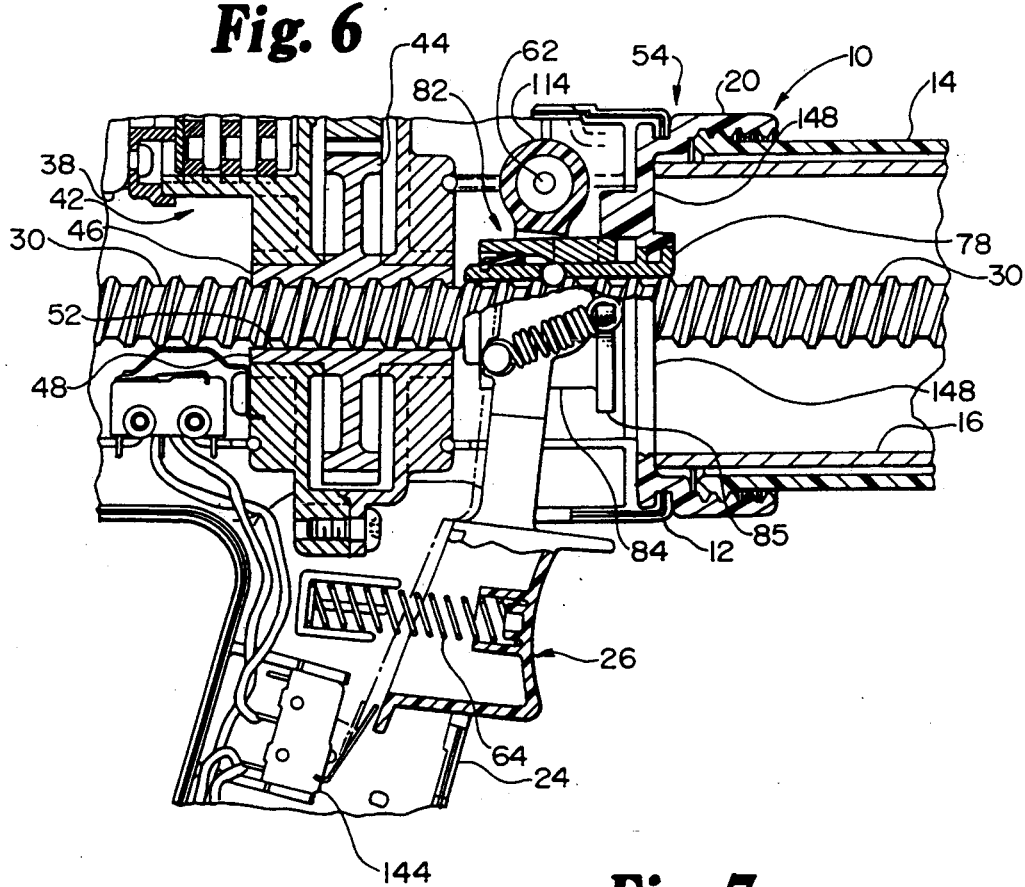
FIG. 6 is a view similar to FIG. 3, but with the trigger partially depressed and with the ball engaged with the ball drive rod and with the gun in a FEATHERING condition.

Referring now most particularly to FIG. 6, when FEATHERING operation is desired, trigger 26 may be moved from the position shown by dashed lines (corresponding to the ON condition) to the position shown in solid in FIG. 6, turning off switch 144 and motor 38 and stopping rotation of rod 30, while still maintaining the engagement of balls 80 with rod 30. In this condition of FEATHERING, gun 10 is mechanically energized, but electrically de-energized; and the viscous substance in cartridge 16 will exit tip or spout 18 more gradually than when gun 10 is both electrically and mechanically energized. The FEATHERING condition of gun 10 permits an operator to taper or "feather" caulk or other viscous substance being applied by the gun.

As can be observed from the drawings, once trigger 26 is fully released, balls 80 will be permitted to move out of engagement with rod 30, relieving pressure on the viscous material, thus preventing unwanted discharge or "drooling" of material when the gun is in the OFF condition.

The invention is not to be taken as limited to all of the details thereof as modifications and variations thereof may be made without departing from the spirit or scope of the invention.

What is claimed is:

1. Apparatus for selectively pressurizing a tube of a highly viscous substance such as caulk, the apparatus comprising:
   a. a pressure plate selectively driven by a ball drive rod having a helical thread and a keyway;
   b. an electric motor and gear reducer coupled to a spur gear keyed to the ball drive rod;
   c. a cylindrical ball retainer having a plurality of pockets located on a helical locus aligned with the helical thread;
   d. a plurality of balls, with one ball in each pocket of the retainer;
   e. a ball drive nut telescoped over and selectively axially moveable between a first and a second position with respect to the ball retainer;
   f. a trigger coupled to the ball drive nut via:
      i. a spring to urge the ball drive nut from the first position towards the second position when the trigger is moved to an actuated position, and
      ii. a bearing surface in axial contact with the ball drive nut to force the ball drive nut to the first position when the trigger is moved to a deactuated position
   wherein the ball drive nut holds the balls in engagement with the rod when the nut is in the second position and the ball drive nut releases the balls from engagement with the rod when the ball drive nut is in the first position, and
   further wherein:
      i. the rod is axially advanced when the motor is energized and the balls are engaged with the rod, and
      ii. the rod is free to be withdrawn when the balls are released from engagement with the rod.

2. The apparatus of claim 1 wherein the motor is de-energized and the rod is held in positive engagement with the balls when the trigger is moved from the actuated position to a holding position intermediate the actuated and deactuated positions, positively retaining the pressure plate in the last position achieved by operation during the actuated position of the trigger such that pressure remains on the tube of viscous substance by the pressure plate until relieved by movement of the viscous substance.

3. The apparatus of claim 1 wherein the helical thread on the ball drive rod has a root having a first diameter and a crown having a second diameter greater than the first diameter.

4. The apparatus of claim 3 wherein the ball drive nut remains in the first position when the trigger is moved to the actuated position and the balls are blocked from engaging the ball drive rod by contact with the crown of the helical thread until the ball drive rod is rotated to position the root of the helical thread of the ball drive rod radially adjacent the balls.

5. The apparatus of claim 4 wherein the balls engage the ball drive rod by moving radially inward into contact with the root of the helical thread and the ball drive nut moves axially to the second position to retain the balls in engagement with the ball drive rod while the trigger is in one of the actuated and holding positions.

6. The apparatus of claim 1 wherein the ball drive nut has an axial bore therethrough having a helical land therein corresponding to the helical locus of the pockets in the ball retainer.

7. Apparatus for selectively pressurizing a tube of viscous substance such as caulk, the apparatus comprising:
   a. an axially movable pressure plate and helically threaded ball drive rod assembly;
   b. drive means for selectively rotating the ball drive rod assembly;

c. a collar assembly encircling the ball drive rod assembly and having a plurality of elements selectively radially movable between:
   i. a first position wherein the collar assembly is disengaged from the rod assembly, permitting the rod assembly freedom to move axially with respect to the collar assembly; and
   ii. a second position wherein the radially movable elements of the collar assembly are engaged with the rod assembly such that the rod assembly is movable axially with respect to the collar assembly when a rod of the rod assembly is rotated with respect to the collar assembly.

8. The apparatus of claim 7 wherein the drive means comprises an electric motor.

9. The apparatus of claim 8 wherein the drive means further comprises a battery selectively connected to the motor.

10. The apparatus of claim,8 wherein the drive means further comprises a variable speed control for the motor.

11. The apparatus of claim.7 wherein the movable elements comprise a plurality of balls.

12. The apparatus of claim 11 wherein the collar assembly further comprises a sleeve having an interior ramp-like surface axially movable to radially displace the balls into and out of engagement between the sleeve and rod.

13. The apparatus of claim 7 wherein the movable elements of the collar assembly remain in sufficient engagement with the rod when the collar assembly is in the first position to prevent the weight of the rod from moving itself with respect to the collar assembly when the apparatus is tilted to permit gravity to pull axially on the rod.

14. The apparatus of claim 13 wherein the movable elements of the collar assembly are biased lightly enough in the first position to permit the rod to be moved manually with respect to the collar assembly.

15. A powered caulking gun of the type having an electric motor for urging a drive rod against a piston in a tube of viscous substance such as caulk, the improvement in combination therewith comprising:
   a. an axially movable pressure plate and helically threaded ball drive rod assembly;
   b. drive means for selectively rotating the ball drive rod assembly;
   c. a collar assembly encircling the ball drive rod and carrying at least one element selectively engageable with the ball drive rod, the collar assembly mounted in a radially extending flange secured to the housing wherein the flange remains relatively rigid below a predetermined maximum pressure and elastically deforms in the axial direction when the predetermined maximum pressure is exceeded such that the element is permitted to move out of engagement with the ball drive rod when the predetermined maximum pressure is exceeded.

16. The powered caulking gun of claim 15 wherein the radially extending flange of the collar assembly further comprises an outer cylindrical portion formed integrally with the radially extending flange and the flange is secured to the housing by a connection to the cylindrical portion.

17. A powered caulking gun of the type having an electric motor for urging a drive rod against a piston in a tube of viscous substance such as caulk, the improvement in combination therewith comprising:
   a. an axially movable pressure plate and helically threaded ball drive rod assembly;
   b. drive means for selectively rotating the ball drive rod assembly;
   c. a collar assembly encircling the ball drive rod assembly and having a plurality of balls for selectively engaging the collar assembly to the ball drive rod wherein the collar assembly includes
      i. a sleeve surrounding the balls and having
         a first ramp portion having a relatively steep slope for urging the balls into engagement with the rod when the sleeve is moved axially in a first direction with respect to the balls, and
         a second ramp portion adjacent the first ramp portion and having a relatively shallow slope sufficient to hold the balls in engagement with the rod below a predetermined level of axial force on the rod while permitting the sleeve to move axially in a second direction opposite the first direction to release the balls from engagement with the rod when the predetermined level of axial force on the rod is exceeded.

18. The powered caulking gun of claim 17 wherein the slope of the first ramp portion is approximately forty degrees from the axis of the rod.

19. The powered caulking gun of claim 17 wherein the slope of the second ramp portion is approximately seven and one half degrees.

20. The powered caulking gun of claim 17 further comprising a manually operable trigger and a spring connected between the trigger and the sleeve for urging the sleeve in the first direction when the trigger is depressed.

21. The powered caulking gun of claim 20 wherein the balls are urged slightly radially inwardly toward the rod by the first ramp portion when the trigger is released, preventing the rod from moving axially under its own weight when the gun is tipped, while simultaneously permitting movement of the rod when the rod is urged axially manually.

22. The powered caulking gun of claim 17 wherein the rod has a helical thread thereon and the balls are positioned on a helical path congruent thereto by the collar assembly and the first and second ramp portions of the sleeve are each aligned with the same helical path.

23. The powered caulking gun of claim 17 wherein the drive means includes a spur gear concentric to the rod and wherein the rod has an axially extending keyway therein and the gear has a key matingly received in the keyway for rotating the rod when the drive means is energized.

* * * * *